(12) United States Patent
Moss et al.

(10) Patent No.: US 11,305,639 B2
(45) Date of Patent: Apr. 19, 2022

(54) BODY STRUCTURE WITH INTEGRATED AIR CHANNEL

(71) Applicant: GM GLOBAL TECHNOLOGY OPERATIONS LLC, Detroit, MI (US)

(72) Inventors: Edward D. Moss, Commerce Township, MI (US); Christopher G. Basela, Ortonville, MI (US); John Ivan Freeburg, Flint, MI (US); Ulhas Grover, Canton, MI (US); Joshua Holder, Clinton Township, MI (US); Thomas James Toft, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 294 days.

(21) Appl. No.: 16/514,160

(22) Filed: Jul. 17, 2019

(65) Prior Publication Data
US 2021/0016654 A1   Jan. 21, 2021

(51) Int. Cl.
| | |
|---|---|
| *B60K 11/08* | (2006.01) |
| *B60K 13/02* | (2006.01) |
| *F02M 35/10* | (2006.01) |

(52) U.S. Cl.
CPC .............. *B60K 11/08* (2013.01); *B60K 13/02* (2013.01); *F02M 35/10091* (2013.01); *F02M 35/10111* (2013.01); *F02M 35/10118* (2013.01); *F02M 35/10124* (2013.01)

(58) Field of Classification Search
CPC ........ B60K 11/08; B60K 13/02; B60K 11/06; F01P 1/06; F01P 2001/005; F02M 35/10091; F02M 35/10111; F02M 35/10118; F02M 35/10124
USPC ......................................................... 296/208
See application file for complete search history.

(56) References Cited

U.S. PATENT DOCUMENTS

| | | | | |
|---|---|---|---|---|
| 5,174,258 | A * | 12/1992 | Tanaka ................... | B62M 27/02 123/198 E |
| 2002/0148427 | A1* | 10/2002 | Jones ............... | F02M 35/10144 123/184.61 |
| 2011/0094219 | A1* | 4/2011 | Palm ..................... | F28F 17/005 60/599 |
| 2014/0265285 | A1* | 9/2014 | Erspamer ............. | B62D 23/005 280/783 |
| 2015/0047615 | A1* | 2/2015 | Rollins ................ | F01M 13/022 123/520 |

(Continued)

*Primary Examiner* — Yi-Kai Wang
(74) *Attorney, Agent, or Firm* — Quinn IP Law

(57) ABSTRACT

A body structure includes a generally trough-shaped first structural member having a floor, two opposed side walls having respective top edges, and an open top along a length of the first structural member defining a generally U-shaped cross-section. The first structural member has a first portion with a first flow direction therethrough and a second portion with a second flow direction therethrough different from the first flow direction, the first portion having opposed first and second ends with a first opening in the first end, the second portion having opposed third and fourth ends with a second opening in the fourth end, wherein the second and third ends are in fluid communication with each other. The first portion has a first average depth and the second portion has a deepened portion having a second average depth larger than the first average depth.

20 Claims, 3 Drawing Sheets

(56) References Cited

U.S. PATENT DOCUMENTS

2018/0125608 A1\* 5/2018 Gotten .................. A61C 3/025
2021/0001715 A1\* 1/2021 Henon .................. B60K 11/08

\* cited by examiner

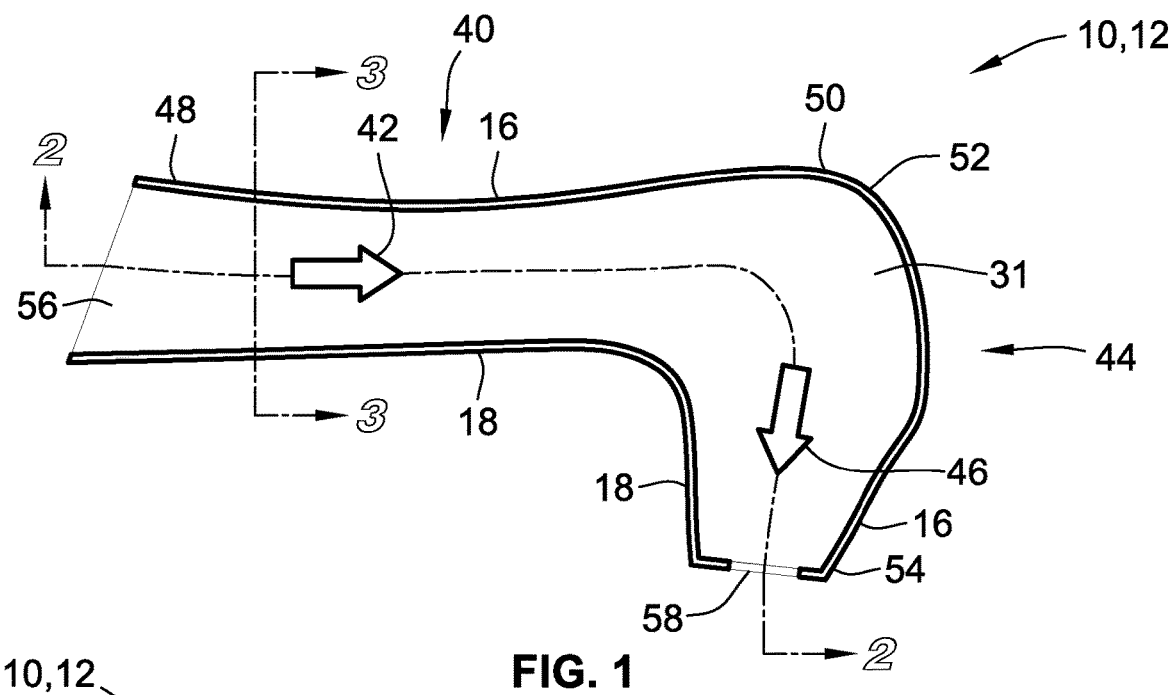
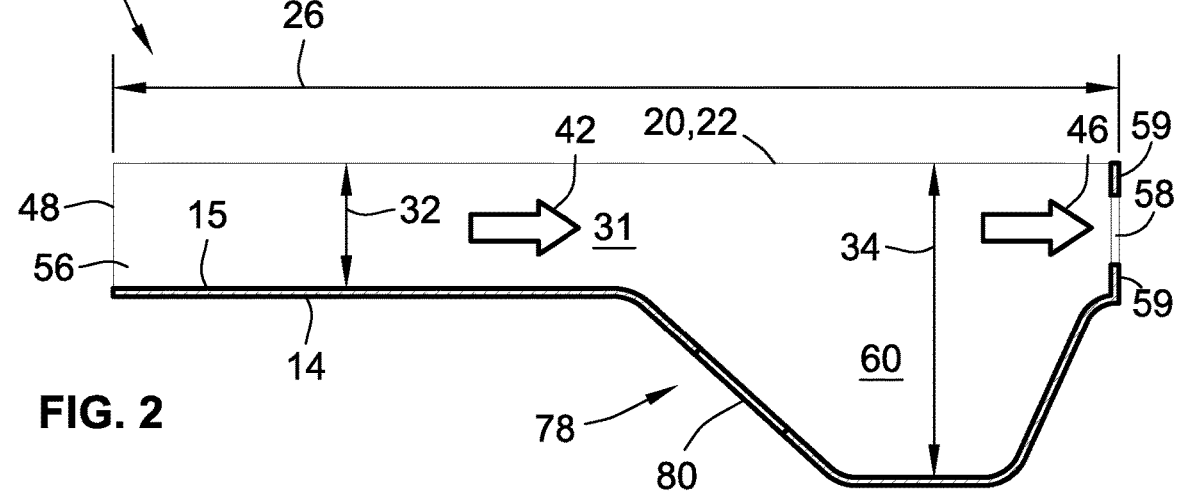
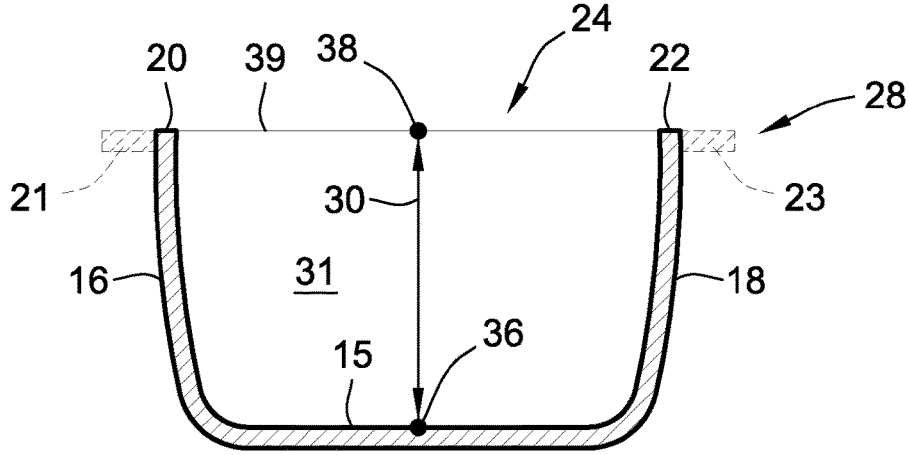

BODY STRUCTURE WITH INTEGRATED AIR CHANNEL

INTRODUCTION

This disclosure relates generally to body structures with integrated air channels.

In the packaging and arrangement of components in automotive vehicles, space is at a premium. Vehicle designers desire to package as much as possible in as little space as possible, while minimizing weight and complexity. This is true not only for automotive applications, but in many other applications as well.

One area where this is particularly true is in and around the engine bay of a vehicle, where multiple systems and components compete for space. For example, air induction systems must route air to an airbox, from a source that is either inside or outside the engine bay. For mid- and rear-engine vehicles, this may entail routing air from outside the engine bay, such as from one or both sides of the vehicle or from over the roof of the vehicle. However, the routing of air ducts from outside the vehicle, through the vehicle, into the engine bay, and into the airbox takes up much-needed space.

SUMMARY

According to one embodiment, a body structure includes a generally trough-shaped first structural member operable as an airflow channel and having a floor, two opposed side walls having respective top edges, and an open top along a length of the first structural member defining a generally U-shaped cross-section. The cross-section has a depth as measured from a center of the floor to a midpoint between the top edges. The first structural member has a first portion with a first flow direction therethrough and a second portion with a second flow direction therethrough which is different from the first flow direction. The first portion has opposed first and second ends with a first opening in the first end, and the second portion has opposed third and fourth ends with a second opening in the fourth end, wherein the second and third ends are in fluid communication with each other. The first portion has a first average depth and the second portion has a deepened portion having a second average depth, wherein the second average depth is larger than the first average depth.

The deepened portion may be disposed closer to the fourth end than to the third end. The body structure may further include a duckbill valve disposed in the floor of the deepened portion, wherein the duckbill valve permits egress of liquid from inside the deepened portion to outside the first structural member. The generally U-shaped cross-section may vary in shape and/or depth along the length of the first structural member. The body structure may further comprise a second structural member attached to the top edges of the first structural member so as to cover at least a portion of the open top and form an enclosed duct along at least a portion of the length of the first structural member.

The floor may include a transition portion wherein the depth transitions from the first average depth to the second average depth, and the transition portion may include an access port configured for at least one of cleanout and attachment to a resonator. The first structural member may be molded from at least one of a plastic material and a composite material, and may include a plurality of attachment points for interfacing with at least three of an airbox, a wheel liner, a side radiator, a fuel vapor system, an engine control module harness, a baffle, an electrical system component and a rear fender.

According to one embodiment, a body structure includes a generally trough-shaped first structural member having a floor, two opposed side walls having respective top edges, and an open top along a length of the first structural member defining a generally U-shaped cross-section, the cross-section having a depth as measured from a center of the floor to a midpoint between the top edges. The first structural member has a first portion with a first flow direction therethrough and a second portion with a second flow direction therethrough different from the first flow direction. The first portion has opposed first and second ends with a first opening in the first end, and the second portion has opposed third and fourth ends with a second opening in the fourth end, wherein the second and third ends are in fluid communication with each other. The first portion has a first average depth and the second portion has a deepened portion having a second average depth larger than the first average depth. A second structural member is attached to the top edges of the first structural member so as to cover at least a portion of the open top and form an enclosed air duct along at least a portion of the length of the first structural member.

The body structure may further include a duckbill valve disposed in the floor of the deepened portion, wherein the duckbill valve permits egress of liquid from inside the deepened portion to outside the first structural member. The generally U-shaped cross-section may vary in shape and depth along the length of the first structural member. The floor may include a transition portion wherein the depth transitions from the first average depth to the second average depth, and wherein the transition portion includes an access port configured for at least one of cleanout and attachment to a resonator. The first structural member may include a plurality of attachment points for interfacing with at least three of an airbox, a wheel liner, a side radiator, a fuel vapor system, an engine control module harness, a baffle, an electrical system component and a rear fender.

According to one embodiment, an air induction system includes a generally trough-shaped first structural member having a floor, two opposed side walls having respective top edges, and an open top along a length of the first structural member defining a generally U-shaped cross-section, the cross-section having a depth as measured from a center of the floor to a midpoint between the top edges. The first structural member has a first portion with a first flow direction therethrough and a second portion with a second flow direction therethrough different from the first flow direction. The first portion has opposed first and second ends with a first opening in the first end, and the second portion has opposed third and fourth ends with a second opening in the fourth end, wherein the second and third ends are in fluid communication with each other. The first portion has a first average depth and the second portion has a deepened portion having a second average depth larger than the first average depth, wherein the deepened portion is disposed closer to the fourth end than to the third end, and wherein the floor includes a transition portion wherein the depth transitions from the first average depth to the second average depth. A second structural member is attached to the top edges of the first structural member so as to cover at least a portion of the open top and form an enclosed air duct along at least a portion of the length of the first structural member.

The an air induction system may further include a duckbill valve disposed in the floor of the deepened portion, wherein the duckbill valve permits egress of liquid from inside the deepened portion to outside the first structural member. The generally U-shaped cross-section may vary in shape and depth along the length of the first structural member. The transition portion may include an access port configured for at least one of cleanout and attachment to a resonator. The first structural member may include a plurality of attachment points for interfacing with at least three of an airbox, a wheel liner, a side radiator, a fuel vapor system, an engine control module harness, a baffle, an electrical system component and a rear fender.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a schematic top plan view of a body structure in accordance with the disclosure.

FIG. 2 is a schematic cross-sectional side view of the body structure of FIG. 1 along section line 2-2 in accordance with the disclosure.

FIG. 3 is a schematic cross-sectional end view of the body structure of FIG. 1 along section line 3-3 in accordance with the disclosure.

DETAILED DESCRIPTION

Figure 4:
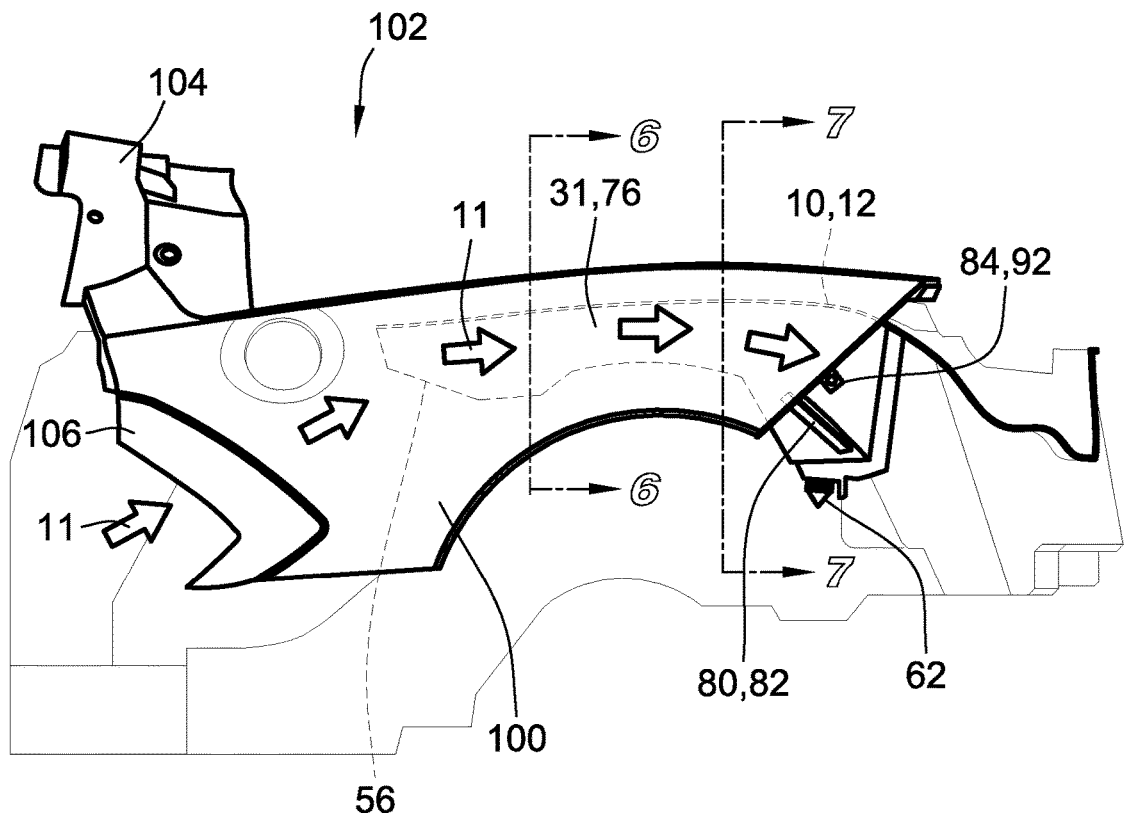
FIG. 4 is a side view of a rear portion of an automobile body frame showing aspects of the body structure in accordance with the disclosure.

Referring now to the drawings, wherein like numerals indicate like parts in the several views, a body structure and/or air induction system 10 having an integrated air channel 31, 76 is shown and described herein. This body structure 10 may provide both structural strength and airflow handling, which may be beneficial in mid-engine, rear-engine and other automotive vehicles.

FIGS. 1-3 show various schematic views of a body structure 10 which includes a generally trough-shaped first structural member 12 operable as an airflow channel 31 and having a bottom surface or floor 14, two opposed side walls 16, 18 having respective top edges 20, 22, and an open top 24 along the length 26 of the first structural member 12, thereby defining a generally U-shaped cross-section 28. The cross-section 28 has a depth 30 as measured from a center 36 of the floor 14 to a midpoint 38 between the top edges 20, 22. This midpoint 38 is also the midpoint of a line 39 connecting one top edge 20 to the other top edge 22. Note that while some of the drawings show the cross-section 28 having a shape or profile that is clearly U-shaped, other drawings show the cross-section as more generally U-shaped. Also, while the shape of the floor 14 may be generally smooth and flat in some instances, in other instances the floor 14 may be arcuate, wavy, undulated or the like. Similarly, some of the drawings show that the cross-sectional shape of the walls 16, 18 may be straight with the walls 16, 18 being of about the same height above the floor 14 and both walls 16, 18 being generally parallel with each other; however, one or both of the walls 16, 18 may be non-straight in shape, may be of different heights, and may be non-parallel with each other. Thus, taking these variations into consideration, the depth 30 of the first structural member 12 (as measured at each cross-section 28) is defined as the distance from the center 36 of the floor 14 (e.g., from the top or interior surface 15 of the floor 14) to the center or midpoint 38 of the line 29 connecting the top edges 20, 22 of the two side walls 16, 18. Also, while the shape of the first structural member 12 is described as generally trough-shaped, this description includes any shape having a generally U-shaped cross-section along at least a majority of the length 26 of the shape.

The first structural member 12 has a first portion 40 with a first flow direction 42 therethrough and a second portion 44 with a second flow direction 46 therethrough which is different from the first flow direction 42. For example, in FIG. 1, note that the first and second flow directions 42, 46 generally point in directions that are about 90 degrees apart from each other; however, they may also point in directions larger or smaller than 90 degrees. The first and second flow directions 42, 46 may be defined by the two side walls 16, 18 for each respective portion 40, 44. The first flow direction 42 may serve to facilitate the introduction of airflow 11 into the first structural member 12, especially if the first structural member 12 is oriented such that the first portion 40 and first flow direction 42 are oriented generally parallel with the external direction of airflow (e.g., along the side of a forward-moving vehicle). The second flow direction 46 may then serve to redirect the flow of air 11 laterally into an airbox 86. The first portion 40 has opposed first and second ends 48, 50 with a first opening 56 in the first end 48, and the second portion 44 has opposed third and fourth ends 52, 54 with a second opening 58 in the fourth end 54, wherein the second and third ends 50, 52 are in fluid communication with each other. (Note that in some configurations, the second and third ends 50, 52 may each describe the same singular location. In this case, the second end 50 of the first portion 40 may coincide with the third end 52 of the second portion 44.) Thus, the two portions 40, 44 are contiguous with each other and provide a continuous flow path or air channel 31 through both portions 40, 44. Note that the first opening 56 may serve as an air induction inlet, while the second opening 58 may serve as an air induction outlet. The fourth end 54 of the second portion 44 may include a wall 59 with an exit opening 58 defined therein; this end 54 and opening 58 may interface with an airbox 86.

The first portion 40 has a first average depth 32 and the second portion 44 has a deepened portion 60 having a second average depth 34, wherein the second average depth 34 is larger than the first average depth 32. The deepened portion 60 may take up a part or segment of the second portion 44, or it may take up the entire length of the second portion 44. Note that since the size and shape of the cross-section 28 may vary along the length 26 of the first structural member 12, the depth 30 of the cross-section 28 along with length 26 may also vary. Likewise, the size, shape and depth 30 of the cross-section 28 along the length of the first portion 40, the second portion 44 and the deepened portion 60 may also vary along their respective lengths. Thus, there are multiple ways in which the average depths 32, 34 may be calculated. For example, for each portion 40, 60, the average depth 32, 34 may be the average of the largest and smallest depths along the length of the respective portion 40, 60; in this case, only two data points are needed for each calculation. Alternatively, the depth 30 may be measured at multiple points along the length of each portion 40, 60, and a simple or weighted average may be calculated for each portion 40, 60 using those multiple measurements.

The deepened portion 60 of the second portion 44 may provide a chamber or space to facilitate the separation of debris and liquids from the flow of induction air 11, so that cleaner and drier air may pass into an airbox 86 attached to the second opening or outlet 58. This chamber or space 60 is described as "deepened" because its depth 34 is generally larger or deeper than the depth 32 of the first portion 40. The deepened portion 60 may be optionally disposed closer to the fourth end 54 of the second portion 44 than to the third end 52, which may further facilitate the aforementioned separation of debris and liquids from the flow of air 11. The body structure 10 may further include a duckbill valve 62 disposed in the floor 14 of the deepened portion 60. The duckbill 62 may have a collar or inlet portion 64 flush with the top surface 15 of the floor 14 and a flapper or outlet portion 66 which acts as a check valve, thereby permitting the egress or disposal of liquid from inside the deepened portion 60 to outside the first structural member 12 (but not allowing liquids to pass into the deepened portion 60 from outside the first structural member 12).

Figure 7:
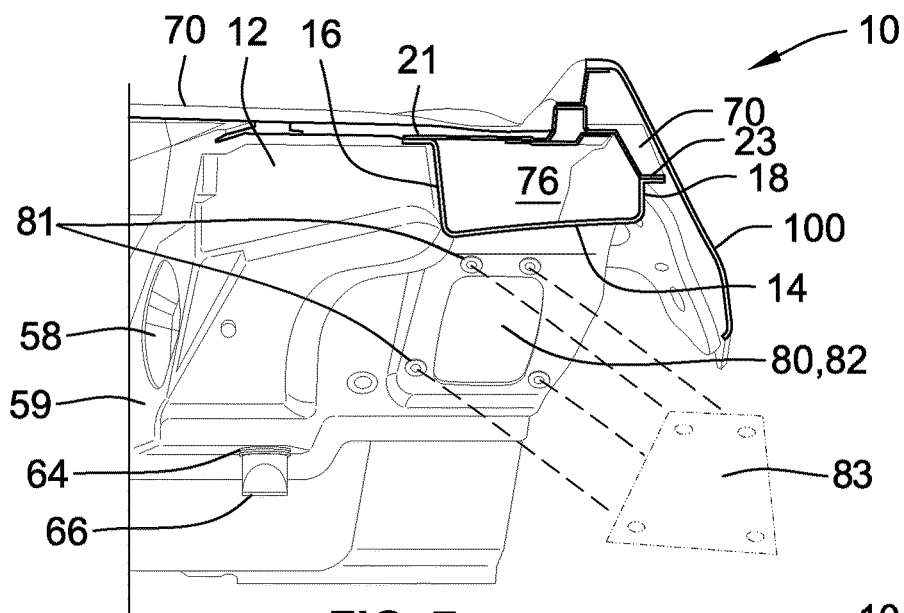
FIG. 7 is a cross-sectional end view of the body structure of FIG. 4 along section line 7-7 in accordance with the disclosure.

The floor 14 of the first structural member 12 may include a transition portion 78 wherein the depth 30 transitions from the first average depth 32 to the second average depth 34. The transition portion 78 may be formed as a ramp or incline to transition from the shallower first average depth 32 to the deeper second average depth 34. The transition portion 78 may be formed as part of the first or second portion 40, 44, or as a separate portion between the first and second portions 40, 44. The transition portion 78 may include an access port or hole 80 to permit at least some portion of the first structural member 12 to be cleaned out, and/or to permit an optional resonator to be attached. Alternatively, the access port 80 may be located in the floor 14 or side wall 16, 18 of any portion of the first structural member 12, including the first and second portions 40, 44. FIG. 7 shows four fasteners 81 around the periphery of the access port 80, which may serve to hold a door 82 in place over the access port 80, or to attach the optional resonator 83 to the access port 80.

The first structural member 12 may be molded from a thermoplastic or thermoset plastic material (including structural foam) and/or a composite material (e.g., fiberglass, carbon fiber, etc.). Alternatively, the first structural member 12 may be molded or fabricated from metal (e.g., magnesium alloy, steel, etc.). The first structural member 12 may also include a plurality of attachment points 84 for interfacing with any number of external components, such as an airbox 86, a wheel liner, a side radiator, a fuel vapor system, an engine control module harness, a baffle, an electrical system component and a rear fender 100. (For example, see the wheel liner attachment points 88, side radiator attachment points 90 and rear fender attachment points 92.) The attachment points 84 may include brackets, sockets, studs, clips, pins, straps, connectors, offsets, receptacles and/or any type of fastening or retaining hardware or provision, which may be attached, molded or formed into the first structural member 12. The attachment points 84 may also include the shaping and configuring of the first structural member 12 so that it may capture external components or be captured by external components. For example, the wall 59 and/or second opening 58 may be shaped so that it may capture and seal with the airbox 86 (and/or so that it may be captured by and seal with the airbox 86). These attachment points 84 may serve to attach the first structural member 12 to its surrounding environment (e.g., to other automotive frame members) and/or may serve for the attachment of other components to the first structural member 12.

Figure 6:
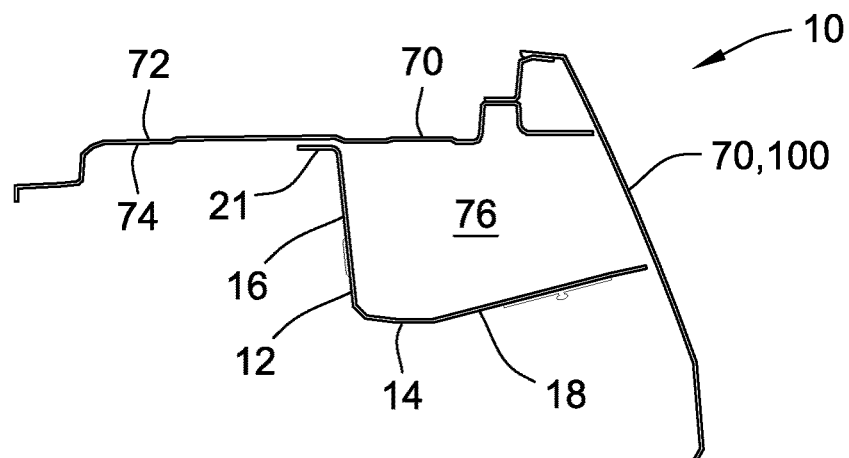
FIG. 6 is a cross-sectional semi-schematic end view of the body structure of FIG. 4 along section line 6-6 in accordance with the disclosure.
Figure 8:
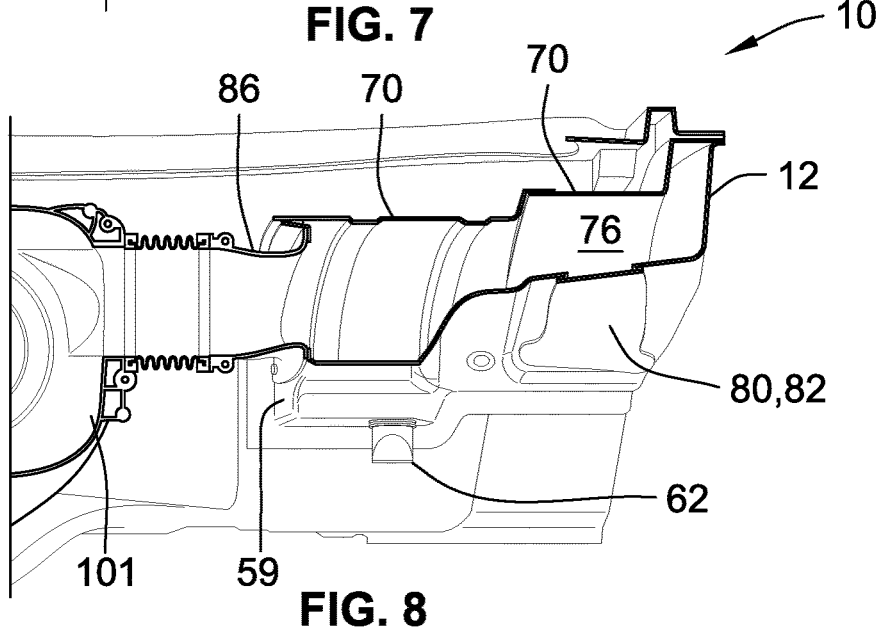
FIG. 8 is a cross-sectional end view of the body structure of FIG. 5 along section line 8-8 in accordance with the disclosure.

The body structure and/or air induction system 10 may further comprise a second structural member 70 attached to the top edges 20, 22 of the first structural member 12, so as to cover at least a portion of the open top 24 and form an enclosed duct 76 along at least a portion of the length 26 of the first structural member 12. The top edges 20, 22 of the first structural member 12 may have optional flanges 21, 23 provided on one or both edges 20, 22 onto which the second structural member 70 may be attached. The second structural member 70 may be a shroud, cover, firewall, bulkhead or other support member in or adjacent to the engine bay, and may be molded or fabricated from a thermoplastic or thermoset plastic material (including structural foam), a composite material (e.g., fiberglass, carbon fiber, etc.) and/or metal (e.g., magnesium alloy, steel, etc.). The second structural member 70 may cover the open top area 24 of the first support member 12 along the entirety of its length 26, or it may cover only a portion of that length 26. (In other words, the body structure and/or air induction system 10 may provide an integrated duct 76 that is not as long as the entire length 26 of the body structure 10. In this case, each portion of the body structure 10 that is not forming the integrated duct 76 may serve as a structural support.) The second structural member 70 may be a single structure, or it may be a combination of two or more structures. For example, in the cross-sectional view shown in FIG. 7, the second structural member 70 appears as a single structure, identified by reference numeral "70". However, in FIGS. 6 and 8, the second structural member 70 appears as two separate structures. In FIG. 6, most of the top of the first structural member 12 is covered by a sheet-like structure having a top surface 72, a bottom surface 74, and identified by reference numeral "70", while a small portion of the first structural member 12 is covered by a rear fender identified by reference numeral "70, 100". In FIG. 8, the first structural member 12 is covered by a two-piece structure, both pieces of which are identified by reference numeral "70".

Figure 5:
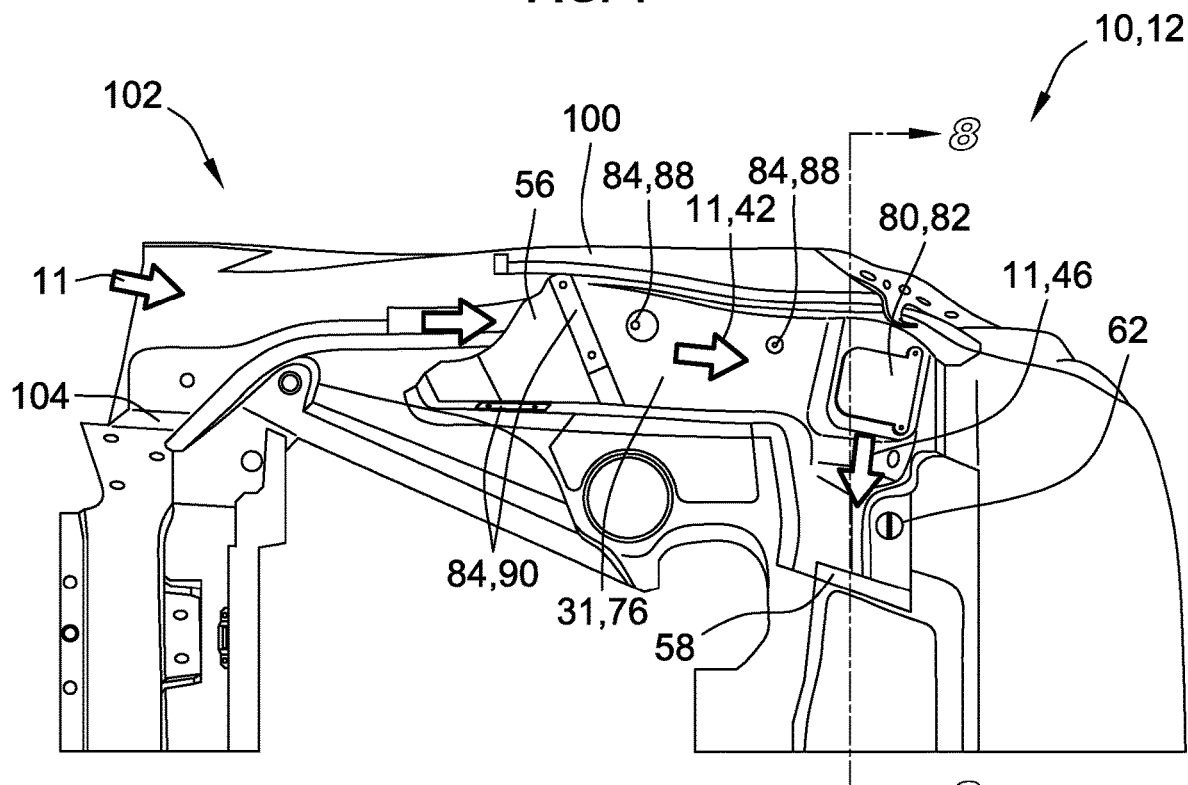
FIG. 5 is a top view of a rear portion of an automobile body frame showing aspects of the body structure in accordance with the disclosure.

FIGS. 4-8 illustrate a specific example of how a body structure and/or air induction system 10 in accordance with the present disclosure may be deployed in an automotive application, particularly in a mid-engine sports car 102. The views shown are rearward of the B-pillar 104 and include a rear fender or quarter panel 100 having an air inlet 106 as shown. FIGS. 4 and 5 show side and top views, respectively, of the rear fender 100, the engine bay and the body structure/air induction system 10. (In FIG. 4, most of the body structure/air induction system 10 is covered by the rear fender 100, so the covered portion is shown in dashed lines.) The air inlet 106 permits the induction of air 11, which is directed by the integrated air channel or air duct 31, 76 along the indicated flow path 11 and into the airbox 86 of the engine 101. The generally trough-shaped first structural member 12 may cooperate with the second structural member 70 to provide a body structure/air induction system 10 having an enclosed duct 76 to act as an air induction channel from the air inlet 106 to the airbox 86.

FIGS. 6-8 show cross-sectional end views at three different points along the air flow path. The drawings illustrate that the cross-sectional area, depth 30 and shape of the enclosed duct 76 may vary along the air flow path. Likewise, the shape and composition of the second structural member 70 may vary along this path as well; as mentioned above, at some points along the path (i.e., at various cross-sections) the second structural member 70 may be a single structure covering the first structural member 12 and at other points or cross-sections two or more structures may cooperate to cover the first structural member 12. However, at all points along the air flow path, the first structural member 12 provides an integrated air channel 31 through which air may be inducted into the airbox 86. Also, due at least in part to its generally U-shaped cross-section 28, the first structural member 12 may additionally provide structural support to the engine bay and/or side panel area where the member 12 is installed. This support may be for the second structural member 70, for components attached to the attachment points 84, and/or for other structures and components located adjacent to the first structural member 12.

The body structure/air induction system 10 disclosed herein may be provided in either of two forms. The first form includes a first structural member 12 having a generally U-shaped cross-section 28, which provides an integrated air channel 31. The second form includes a first structural member 12 plus an attached second structural member 70, which together provide an integrated air channel 31 as well as an enclosed duct 76 through which inducted air 11 may be directed. In either form, the deepened portion 60 provides a chamber to facilitate the separation of debris and liquids from the inducted air 11 so that cleaner and drier air may be inducted into the airbox 86. The optional duckbill valve 62 may serve to keep the bottom of the deepened portion 60 more dry by permitting accumulated liquid to exit through the valve 62. The access port 80 and door 82 permit the interior of the body structure 10 to be manually cleaned out, and/or for an optional resonator 83 to be attached thereto. In addition to or instead of the body structure/air induction system 10 being used to direct airflow 11 into an airbox 86, it may also be utilized to direct airflow 11 to other destinations and/or for other purposes. For example, the airflow 11 may be directed to one or more radiators or heat exchange devices, to cool electronics or other heated components, to drive a mechanical pump or impeller, and the like. Along with the provision of various attachment points 84, the foregoing aspects of the body structure/air induction system 10 provide multiple advantages and benefits.

The above description is intended to be illustrative, and not restrictive. While various specific embodiments have been presented, those skilled in the art will recognize that the disclosure can be practiced with various modifications within the spirit and scope of the claims. For example, the above-described embodiments (and/or aspects thereof) may be used in combination with each other. While the dimensions and types of materials described herein are intended to be illustrative, they are by no means limiting and are exemplary embodiments. Many other embodiments will be apparent to those of skill in the art upon reviewing the above description. Moreover, in the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And, as used herein, "generally" means "for the most part", "to a significant extent" and/or "to a large degree", and does not necessarily mean "perfectly", "completely", "strictly" or "entirely".

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A body structure for inducting air into an airbox of an automotive vehicle, comprising:
    a generally trough-shaped first structural member operable as an airflow channel and having a floor, two opposed side walls having respective top edges, and an open top along a length of the first structural member defining a generally U-shaped cross-section, the cross-section having a depth as measured from a center of the floor to a midpoint between the top edges;
    the first structural member having a first portion with a first flow direction therethrough and a second portion with a second flow direction therethrough different from the first flow direction, the first portion having opposed first and second ends with a first opening in the first end, the second portion having opposed third and fourth ends with a second opening in the fourth end, wherein the second and third ends are in fluid communication with each other;
    wherein the first portion has a first average depth and the second portion has a deepened portion having a second average depth, the second average depth is larger than the first average depth, the first opening is configured for receiving air into the airflow channel, and the second opening is configured for attachment to the airbox of the automotive vehicle and for providing air from the airflow channel to the airbox.

2. A body structure according to claim 1, wherein the deepened portion is disposed closer to the fourth end than to the third end.

3. A body structure according to claim 1, further comprising a duckbill valve disposed in the floor of the deepened portion, wherein the duckbill valve permits egress of liquid from inside the deepened portion to outside the first structural member.

4. A body structure according to claim 1, wherein the generally U-shaped cross-section varies in shape along the length of the first structural member.

5. A body structure according to claim 1, wherein the generally U-shaped cross-section varies in depth along the length of the first structural member.

6. A body structure according to claim 1, further comprising:
    a second structural member attached to the top edges of the first structural member so as to cover at least a portion of the open top and form an enclosed duct along at least a portion of the length of the first structural member.

7. A body structure according to claim 1, wherein the floor includes a transition portion wherein the depth transitions from the first average depth to the second average depth.

8. A body structure according to claim 7, wherein the transition portion includes an access port configured for at least one of cleanout and attachment to a resonator.

9. A body structure according to claim 1, wherein the first structural member includes a plurality of attachment points for interfacing with at least three of the airbox, a wheel liner, an engine control module harness, an electrical system component and a rear fender.

10. A body structure according to claim 1, wherein the first structural member is molded from at least one of a plastic material and a composite material.

11. A body structure for inducting air into an airbox of an automotive vehicle, comprising:

a generally trough-shaped first structural member having a floor, two opposed side walls having respective top edges, and an open top along a length of the first structural member defining a generally U-shaped cross-section, the cross-section having a depth as measured from a center of the floor to a midpoint between the top edges;

the first structural member having a first portion with a first flow direction therethrough and a second portion with a second flow direction therethrough different from the first flow direction, the first portion having opposed first and second ends with a first opening in the first end, the second portion having opposed third and fourth ends with a second opening in the fourth end, wherein the second and third ends are in fluid communication with each other;

wherein the first portion has a first average depth and the second portion has a deepened portion having a second average depth larger than the first average depth; and a second structural member attached to the top edges of the first structural member so as to cover at least a portion of the open top and form an enclosed air duct along at least a portion of the length of the first structural member;

wherein the first opening is configured for receiving air into the enclosed air duct; and wherein, proximate the second opening, the enclosed air duct is configured for attachment to the airbox of the automotive vehicle and for providing air from the enclosed air duct to the airbox.

12. A body structure according to claim 11, further comprising a duckbill valve disposed in the floor of the deepened portion, wherein the duckbill valve permits egress of liquid from inside the deepened portion to outside the first structural member.

13. A body structure according to claim 11, wherein the generally U-shaped cross-section varies in shape and depth along the length of the first structural member.

14. A body structure according to claim 11, wherein the floor includes a transition portion wherein the depth transitions from the first average depth to the second average depth, and wherein the transition portion includes an access port configured for at least one of cleanout and attachment to a resonator.

15. A body structure according to claim 11, wherein the first structural member includes a plurality of attachment points for interfacing with at least three of the airbox, a wheel liner, an engine control module harness, an electrical system component and a rear fender.

16. An air induction system for inducting air into an airbox of an automotive vehicle, comprising:

a generally trough-shaped first structural member having a floor, two opposed side walls having respective top edges, and an open top along a length of the first structural member defining a generally U-shaped cross-section, the cross-section having a depth as measured from a center of the floor to a midpoint between the top edges;

the first structural member having a first portion with a first flow direction therethrough and a second portion with a second flow direction therethrough different from the first flow direction, the first portion having opposed first and second ends with a first opening in the first end, the second portion having opposed third and fourth ends with a second opening in the fourth end, wherein the second and third ends are in fluid communication with each other;

wherein the first portion has a first average depth and the second portion has a deepened portion having a second average depth larger than the first average depth, wherein the deepened portion is disposed closer to the fourth end than to the third end, and wherein the floor includes a transition portion wherein the depth transitions from the first average depth to the second average depth; and a second structural member attached to the top edges of the first structural member so as to cover at least a portion of the open top and form an enclosed air duct along at least a portion of the length of the first structural member;

wherein the first opening is configured for receiving air into the enclosed air duct;

wherein, proximate the second opening, the enclosed air duct is configured for attachment to the airbox of the automotive vehicle and for providing air from the enclosed air duct to the airbox; and wherein the first structural member includes a plurality of attachment points for interfacing with at least three of the airbox, a wheel liner, an engine control module harness, and electrical system component and a rear fender.

17. An air induction system according to claim 16, further comprising a duckbill valve disposed in the floor of the deepened portion, wherein the duckbill valve permits egress of liquid from inside the deepened portion to outside the first structural member.

18. An air induction system according to claim 16, wherein the generally U-shaped cross-section varies in shape and depth along the length of the first structural member.

19. An air induction system according to claim 16, wherein the transition portion includes an access port configured for at least one of cleanout and attachment to a resonator.

20. An air induction system according to claim 16, wherein the airbox is configured for attachment to the engine.

* * * * *